(12) United States Patent
Ichino

(10) Patent No.: US 7,792,434 B2
(45) Date of Patent: Sep. 7, 2010

(54) OPTICAL RECEIVER

(75) Inventor: Moriyasu Ichino, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 767 days.

(21) Appl. No.: 11/514,321

(22) Filed: Sep. 1, 2006

(65) Prior Publication Data

US 2007/0053699 A1    Mar. 8, 2007

(30) Foreign Application Priority Data

Sep. 7, 2005    (JP) ................... P.2005-259478

(51) Int. Cl.
H04B 10/06    (2006.01)
(52) U.S. Cl. ..................... 398/208; 398/209
(58) Field of Classification Search .......... 398/208, 398/209, 213, 202, 210
See application file for complete search history.

(56) References Cited

U.S. PATENT DOCUMENTS

| 6,498,670 | B2 * | 12/2002 | Yamashita et al. ......... 398/209 |
| 7,039,327 | B2 * | 5/2006 | Kim et al. ................... 398/202 |
| 7,123,846 | B2 * | 10/2006 | Tateyama et al. ........... 398/209 |
| 7,231,152 | B2 * | 6/2007 | Kim et al. ................... 398/208 |
| 2004/0008984 | A1 * | 1/2004 | Gerrish et al. ............. 398/25 |
| 2004/0067060 | A1 * | 4/2004 | Aronson et al. ............ 398/135 |

FOREIGN PATENT DOCUMENTS

| JP | 62-118556 | 5/1987 |
| JP | 63-74304 | 4/1988 |
| JP | 2-4033 | 1/1990 |
| JP | 3-46257 | 4/1991 |
| JP | 3-273704 | 12/1991 |
| JP | 11-346194 | 12/1999 |
| JP | 2000-134160 | 5/2000 |
| JP | 2000-201031 | 7/2000 |
| JP | 2000-134160 | * 12/2000 |
| JP | 2002-84235 | 3/2002 |
| JP | 2004-15552 | 1/2004 |
| JP | 2004-40223 | 2/2004 |
| JP | 2005-117464 | 4/2005 |

OTHER PUBLICATIONS

Notification of Reasons of Rejection with English translation dated Dec. 8, 2008.

* cited by examiner

Primary Examiner—M. R. Sedighian
(74) Attorney, Agent, or Firm—Smith, Gambrell & Russell, LLP

(57) ABSTRACT

An optical receiver of the present embodiment has a light-receiving block, a discriminating block, a detecting block, a controlling block, and an adjusting block. The light-receiving block generates complementary signals in accordance with a photo current output from a semiconductor light-receiving element which receives an optical signal. The discriminating block has a differential amplifier having input terminals connected to output terminals of the light-receiving block via respective coupling capacitors. The detecting block generates an intensity signal corresponding to the photo current. The controlling block generates a first signal in accordance with a dispersion signal corresponding to dispersion of an optical transmission line, a distance signal corresponding to the distance of the optical transmission line, and an intensity signal. The adjusting block generates a second signal used for adjusting an offset voltage between the inputs of the differential amplifier in accordance with the first signal, and an output terminal of the adjusting block is connected to one of the input terminals of the differential amplifier for providing the second signal.

8 Claims, 8 Drawing Sheets

FIG. 2

| Di \ Dd | DI | DI1 | DI2 | | | | DI3 | | | |
|---|---|---|---|---|---|---|---|---|---|---|
| | | | Dd1 | Dd2 | Dd3 | Dd4 | Dd1 | Dd2 | Dd3 | Dd4 |
| Di1 | | | | | · | | | | | |
| Di2 | | | · | · | · | D1232 | · | · | · | · |
| Di3 | | | | | · | | | | | |
| ⋮ | | | | | ⋮ | | | | | |

←D1

OPTICAL RECEIVER

BACKGROUND OF THE INVENTION

1. Field of the Invention

The present invention relates to an optical receiver.

2. Related Art

An optical receiver converts, into an electrical signal, an optical signal received by a light-receiving element, such as a PIN-type photodiode (PIN-PD) or an avalanche photodiode (APD), and compares this electrical signal with a reference voltage, to thus discriminate an electrical signal. In such an optical receiver, when distortion exists in the waveform of the optical signal, a crosspoint in the waveform of the electrical signal deviates from the reference voltage, thereby degrading receiving sensitivity.

An optical receiver described in Japanese Patent published as JP-H11-346194A alters a threshold value (a reference voltage) used for discrimination even when an overshoot has arisen in the waveform of an optical signal output from an optical transmitter due to the relaxation oscillation; namely, even when the waveform of the optical signal has become distorted, thereby suppressing a reduction in receiving sensitivity. An optical receiver described in Japanese Patent published as JP-2000-134160A suppresses a reduction in the optical sensitivity, by changing a crosspoint in the waveform of a signal input to a discriminator even when a distortion has arisen in the waveform of an optical signal for reasons of a characteristic of blurring of a light-emitting side of a laser light source of an optical transmitter.

However, the optical receiver described in Patent Document 1 installs an AGC circuit as a means for suppressing the reduction in the optical sensitivity, and hence the optical receiver itself becomes large. Moreover, the optical receiver consumes large amounts of power. In the case of the long-distance optical communication, the distortion in the waveform of the optical signal is primarily ascribed not to characteristics of the optical transmitter but to the dispersion in an optical transmission line. The optical receivers described in Patent Documents 1 and 2 detect the intensity of an optical input for suppressing the reduction in the optical sensitivity. However, this is insufficient for suppressing the reduction in the optical sensitivity induced by the distortion of the waveform of the optical signal attributed to the dispersion in the optical transmission line.

Accordingly, the present invention is to provide an optical receiver that is able to suppress a reduction in the optical sensitivity induced by the distortion of the waveform of an optical signal attributed to the dispersion in an optical transmission line, as well as suppressing a reduction in the optical sensitivity induced by a change in the intensity of an optical input without an AGC circuit.

SUMMARY OF THE INVENTION

An optical receiver of the present invention is for receiving an optical signal, and comprises a light-receiving block, a discriminating block, a detecting block, a controlling block, and an adjusting block. The light-receiving block has a pair of output terminals which generate a pair of complementary signals in accordance with a photo current output from a semiconductor light-receiving element which receives an optical signal and provides the pair of complementary signals. The discriminating block has a differential amplifier having a pair of input terminals connected to a pair of output terminals of the light-receiving block via respective coupling capacitors. The detecting block is connected between a power supply for the semiconductor light-receiving element and the light-receiving block, and generates an intensity signal corresponding to the photo current. The controlling block generates a first signal based on a dispersion signal corresponding to the dispersion of the optical transmission line for propagating the optical signal, a distance signal corresponding to the distance of the optical transmission line, and an intensity signal. The adjusting block has an output terminal connected to one of the inputs of the differential amplifier in order to generate a second signal used for adjusting an offset voltage between the inputs of the differential amplifier by the first signal and provide the second signal.

In this optical receiver, the controlling block generates a first signal based on the dispersion signal, the distance signal, and the intensity signal. The adjusting block adjusts the second signal based on the first signal. By the second signal, the offset voltage between the inputs of the differential amplifier of the discriminating block is adjusted. Hence, a crosspoint in the waveforms of complementary signals are changed. Since the discriminating block configures the differential amplifier, the complementary signal is discriminated at the crosspoint in the waveforms of the complementary signals. Consequently, according to the optical receiver, even when the distortion has occurred in the waveform of the optical signal for reasons of the dispersion of the optical transmission line and the transmission distance, the crosspoint in the waveforms of complementary signals is altered in accordance with the dispersion and the transmission distance of the optical transmission line. Consequently, a discrimination level is changed. Moreover, according to the optical receiver, the crosspoint in the waveforms of the complementary signals is altered by the intensity of the optical signal. Consequently, the discrimination level is altered.

The controlling block preferably comprises an interface which, upon receipt of a dispersion signal and a distance signal, generates a dispersion digital signal corresponding to the dispersion signal and a distance digital signal corresponding to the distance signal; an analog-to-digital converter for generating an intensity digital signal corresponding to an intensity signal; a first memory which is connected to the interface and the analog-to-digital converter, stores a plurality of values assigned respectively to a plurality of sets, each set being formed from a dispersion value, a transmission distance value, and a signal optical intensity value, and provides a first digital signal corresponding to the dispersion digital signal, the distance digital signal, and the intensity digital signal; and a first digital-to-analog converter which is connected to the first memory and generates a first signal corresponding to the first digital signal.

The controlling block may also comprise an interface which, upon receipt of a transmission rate signal corresponding to the transmission rate of an optical signal, a dispersion signal, and a distance signal, generates a transmission rate digital signal corresponding to the transmission rate signal, a dispersion digital signal corresponding to the dispersion signal, and a distance digital signal corresponding to the distance signal; an analog-to-digital converter for generating an intensity digital signal corresponding to an intensity signal; a first memory which is connected to the interface and the analog-to-digital converter, stores a plurality of values assigned respectively to a plurality of sets, each set being formed from a dispersion value, a transmission distance value, and a signal optical intensity value, and provides a first digital signal corresponding to the dispersion digital signal, the distance digital signal, and the intensity digital signal; a second memory which is connected to the interface and the analog-to-digital converter, stores a plurality of values assigned respectively to a plurality of sets, each set being formed from a transmission rate value and a signal optical intensity value, and provides a second digital signal corresponding to the transmission rate digital signal and the intensity digital signal; a first digital-to-analog converter which is connected to the first memory and generates a first signal corresponding to the first digital signal; and a second digital-to-analog converter which is connected to the second memory and generates a third signal corresponding to the second digital signal. Now, the semiconductor light-receiving element is an avalanche photodiode, and the power supply alters a bias voltage supplied to the avalanche photodiode in accordance with the third signal.

As the transmission rate of the optical signal decreases, the phase margin of the waveform of an optical signal and the phase margin of the waveform of data received by the discriminating block become large. Hence, the optical sensitivity increases, and the optical receiver shows the optical sensitivity greater than that required. Accordingly, based on the transmission rate signal, the bias voltage of the avalanche photodiode; namely, a multiplication factor, of the optical receiver is altered. Hence, when the transmission rate of the optical signal has decreased, the bias voltage of the avalanche photodiode can be decreased such that the optical sensitivity is maintained essentially constant with respect to the transmission rate of the optical signal. Consequently, when the transmission rate of the optical signal is low, the optical receiver can save the power consumption.

In this optical receiver, the bias voltage of the avalanche photodiode; namely, a multiplication factor, is altered in accordance with the intensity signal. Accordingly, when the intensity of the signal light has increased, the bias voltage of the avalanche photodiode can be decreased. Consequently, when the intensity of the signal light is high, the optical receiver can save the power consumption.

The optical receiver of the present invention further comprises a temperature sensor which includes a temperature-sensitive device and generates a temperature signal corresponding to the temperature of a semiconductor light-receiving element. The temperature signal may also be a temperature digital signal showing a digital value. Moreover, the controlling block may also comprise an interface which, upon receipt of a transmission rate signal corresponding to the transmission rate of an optical signal, a dispersion signal, and a distance signal, generates a transmission rate digital signal corresponding to the transmission rate signal, a dispersion digital signal corresponding to the dispersion signal, and a distance digital signal corresponding to the distance signal; an analog-to-digital converter for generating an intensity digital signal corresponding to an intensity signal; a first memory which is connected to the interface and the analog-to-digital converter, stores a plurality of values assigned respectively to a plurality of sets, each set being formed from a dispersion value, a transmission distance value, and a signal optical intensity value, and provides a first digital signal corresponding to the dispersion digital signal, the distance digital signal, and the intensity digital signal; a second memory which is connected to the temperature sensor, the interface, and the analog-to-digital converter, stores a plurality of values assigned respectively to a plurality of sets, each set being formed from a temperature value, a transmission rate value, and a signal optical intensity value, and provides a second digital signal corresponding to the temperature digital signal, the transmission rate digital signal, and the intensity digital signal; a first digital-to-analog converter which is connected to the first memory and generates a first signal corresponding to the first digital signal; and a second digital-to-analog converter which is connected to the second memory and generates a third signal corresponding to the second digital signal. The semiconductor light-receiving element is an avalanche photodiode, and the power supply alters a bias voltage supplied to the avalanche photodiode in accordance with the third signal.

In addition to the above advantages of the optical receiver, this optical receiver alters the bias voltage of the avalanche photodiode; namely, a multiplication factor, in accordance with the temperature signal. Hence, even when fluctuations have occurred in the temperature of the avalanche photodiode, the multiplication factor of the avalanche photodiode is corrected such that the optical sensitivity is minimized.

BRIEF DESCRIPTION OF THE DRAWINGS

FIG. 2 is a view showing an example of a first LUT;

DESCRIPTION OF THE PREFERRED EMBODIMENTS

Figure 1:
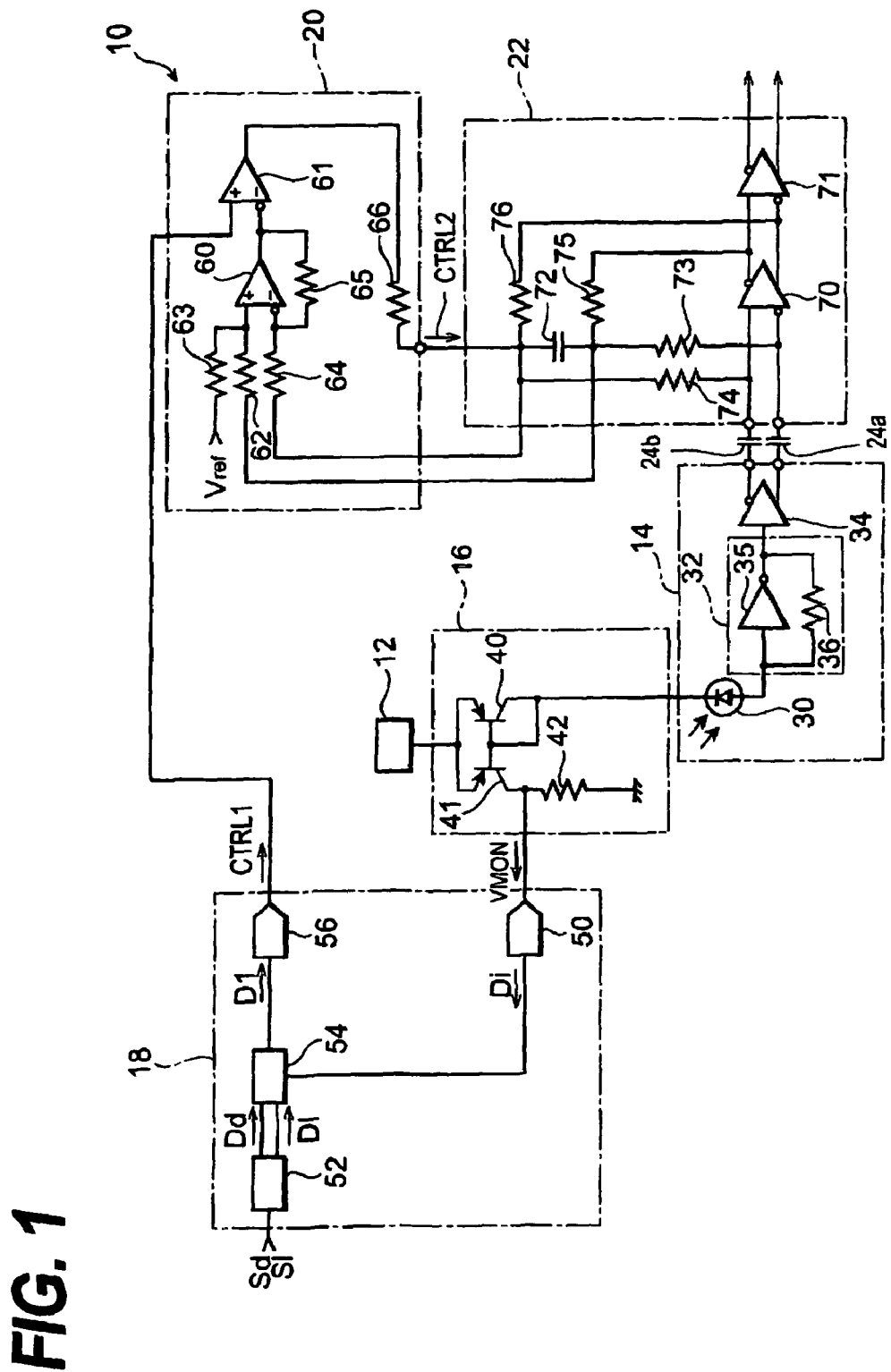
FIG. 1 is a circuit diagram showing the configuration of an optical receiver according to a first embodiment of the present invention.

Preferred embodiments of the present invention will be described in detail hereunder by referring to the drawings. Throughout the drawings, same or corresponding elements are assigned same reference numerals.

First Embodiment

FIG. 1 is a block diagram showing the configuration of an optical receiver according to a first embodiment of the present invention. An optical receiver 10 has a power supply 12, a light-receiving block 14, a detecting block 16, a controlling block 18, an adjusting block 20, a discriminating block 22, and coupling capacitors 24a, 24b.

The power supply 12 is, e.g., a DC/DC converter, and generates a d.c. voltage. The d.c. voltage is supplied as a bias voltage to the cathode of a semiconductor light-receiving element 30 in the light-receiving block 14 via the detecting block 16. In the present embodiment, the semiconductor light-receiving element 30 is an avalanche photodiode (hereinafter abbreviated as "APD").

The light-receiving block 14 has the APD 30, a transimpedance amplifier (hereinafter abbreviated as "TIA") 32, and an amplifier 34. Upon receipt of an optical signal, the light-receiving block 14 outputs a complementary signal corresponding to the optical signal. Upon receipt of the optical signal, the APD 30 generates a photo current corresponding to this optical signal. The anode of the APD 30 is connected to an input terminal of the TIA 32. The TIA 32 has an amplifier 35, and a feedback resistor 36 connected between the input and output terminals of the amplifier 35. The photo current flows through the feedback resistor 36 and flows into an output terminal of the amplifier 35, whereby the potential of an output from the amplifier 35 is changed and converted into a voltage signal. The output terminal of the TIA 32 is connected to the buffer 34, and the buffer 34 converts an output into a complementary signal. The thus-converted complementary signal is output from the light receiving block 14.

The detecting block 16 is provided between the power supply 12 and the light-receiving block 14. The detecting block 16 has a current-mirror circuit, and detects the photo current generated by the APD 30; for instance, a mean value of the photo current, thereby generating a monitor signal VMON corresponding to the photo current. The current-mirror circuit includes p-n-p transistors 40 and 41. When the photo current has flowed into the transistor 40, a mirror current proportional to this photo current flows through the transistor 41. As a result of the mirror current flowing through a detection resistor 42, a potential difference arises across the resistor 42, whereby the monitor signal VMON corresponding to the mirror current is generated. This monitor signal VMON is led to the controlling block 18.

In addition to the reception of the monitor signal VMON, the controlling block 18 receives a dispersion signal Sd and a distance signal Sl, to thus generate a first control signal CTRL 1. The dispersion signal Sd represents the degree of dispersion of an optical transmission line (an optical fiber) through which the optical signal has propagated, and corresponds to, e.g., the magnitude of dispersion per unit length of the optical transmission line. The distance signal Sl represents a distance over which the optical signal has propagated. The dispersion signal Sd and the distance signal Sl are set to, e.g., arbitrary values at the time of installation of an optical receiver, and are input by a host device.

Specifically, the controlling block 18 comprises an analog-to-digital converter (hereinafter abbreviated as "A/D-C") 50; an interface 52; a first memory 54; and a first digital-to-analog converter (hereinafter abbreviated as "D/A-C") 56.

Upon receipt of the intensity signal VMON from the detecting block 16, the A/D-C 50 generates an intensity signal Di. An output terminal of the A/D-C 50 is connected to the first memory 54. Upon receipt of the dispersion signal Sd and the distance signal Sl from the host device, the interface 52 outputs, to the first memory 54, a digital signal Dd corresponding to the dispersion signal Sd and a digital distance signal Dl corresponding to the distance signal Sl. The first storage memory 54 outputs a signal D1 to the D/A-C 56 in response to the intensity signal Di, the dispersion signal Dd, and the distance signal Dl. The first memory 54 stores, in the form of a first lookup table (hereinafter abbreviated as "LUT"), a plurality of values used by the discriminating block 22 to alter the crosspoint of the complementary signals output from the light-receiving section 14, in such a way as to maximize the optical sensitivity. These values are assigned to a plurality of sets, each of which comprises dispersion, a transmission distance, and the optical intensity of a signal. Specifically, in relation to these values, a first signal D1 is stored in the first memory 54 in association with the intensity signal Di, the dispersion signal Dd, and the distance signal Dl.

FIG. 2 is a view showing an example of a first LUT. For instance, assuming that the distance signal Dl is D12, the dispersion signal Dd is Dd3, and the intensity signal Di is Di2, the first signal D1 is uniquely determined to be D1232. Such a first LUT may be prepared based on a result of a test performed in advance; may be set based on a measurement of an individual optical receiver carried out at the time of the shipment; or may be set based on a simulation. Details on a method for setting the first LUT will be described later.

The output D1 from the first storage section 54 is converted into a first control signal CTRL 1 via the first D/A-C 56, and the thus converted signal is delivered to the adjusting block 20. In response to the first control signal CTRL 1, the adjusting block 20 outputs a second control signal CTRL 2 for adjusting an offset voltage between two inputs (complementary inputs) of the discriminating block 22. A first amplifier 60 amplifies a difference between the differential input signals of the discriminating block via resistors 62, 64. A second amplifier 61 amplifies a difference between an output from the first amplifier 60 and the first control signal CTRL 1 to thus generate the second control signal CTRL 2 and feed the signal back to the input terminal of the discriminating block 22. When gains of the two amplifiers are very large, an output from the second amplifier 61 is changed so as to become equal to two inputs of the second amplifier 61; namely, the first control signal CTRL 1 and the output from the first amplifier 60. The output of the second amplifier 61 is fed back to only one of the input terminals of the discriminating block 22 by way of a resistor 66. Accordingly, an input offset of the discriminating block 22 can be changed by changing the first control signal CTRL 1.

For instance, when the first control signal CTRL 1 is equivalent to a reference voltage Vref, the second control signal CTLR 2 is output such that complementary input levels of the discriminating block 22 become equal. When the first control signal CTRL 1 is different from the reference voltage Vref, a potential difference arises between the complementary inputs of the discriminating block 22.

The discriminating block 22 has a first limiter amplifier 70, a second limiter amplifier 71, a coupling capacitor 72, and resistors 73 to 76. One of the input terminals of the discriminating block 22 is connected to one of the output terminals of the light-receiving block 14 via the coupling capacitor 24a. The other input terminal of the discriminating block 22 is connected to the other output terminal of the light-receiving block 14 via the coupling capacitor 24b. The discriminating block 22 discriminates data included in a complementary data signal output from the light-receiving block 14.

The first limiter amplifier 70 is connected to the input terminal of the discriminating section 22, and receives the complementary data signal output from the light-receiving section 14 via the coupling capacitors 24a and 24b. Two inputs of the first limiter amplifier 70 are connected to the controlling block via the respective resistors 73, 74; and are further short-circuited by the capacitor 72 in the manner of an alternating current. An offset voltage is induced between two inputs of the first limiter amplifier 70 by the second control signal CTRL 2 generated by the controlling block. An output from the first limiter amplifier 70 is fed back to the input terminal of the first limiter amplifier 70 via the resistors 75, 76.

The gain of the first limiter amplifier 70 is set to be very large. Therefore, the first limiter amplifier selectively amplifies data in a portion of the vicinity of an average of the input complementary signals, and acts as a comparator. Specifically, the first limiter amplifier 70 detects inversion of data at the crosspoint in the waveforms of complementary signals, thereby discriminating data. As mentioned above, a crosspoint in the waveforms of complementary signals serves as a discrimination level for the first limiter amplifier 70. Consequently, an offset voltage between the inputs of the first limiter amplifier 70 is adjusted to thus alter the crosspoint in the complementary signals, whereby the data discrimination level is changed.

Next, an example method for setting the first LUT shown in FIG. 2 is described. First, the first D/A-C 56 is separated from the amplifier 61, and the A/D-C 50 is separated from the first memory 54. Thus, the first memory 54 is made subordinate to the host device. Next, there are set a transmission distance of an optical fiber used for coupling the optical receiver 10 of the present embodiment with a standard optical transmitter, the magnitude of accumulated dispersion, and the optical intensity output from the standard optical transmitter. The transmission distance is taken as a distance signal Sl, and the dispersion per unit length of an optical fiber determined from the magnitude of the accumulated dispersion is taken as a dispersion signal Sd. Next, a signal is input to the first input terminal of the second amplifier 61, and the signal is changed to thus measure the intensity of a signal at which the optical sensitivity of the optical receiver 10 is maximized. The intensity is set to the first control signal CTRL 1. The first control signal CTRL 1, the dispersion signal Sd, and the distance signal Sl, all of which have been determined as mentioned above, are converted into the digital form, to thus determine signals D1, Dd, Dl, and Di.

Next, any one of the factors; namely, the transmission distance of the optical transmission line, the amount of dispersion, and the intensity of optical signal output from the standard optical transmitter is changed to thereby determine the signals D1, Di, Dd, and Dl. Through the iteration of the measurement, the first LUT such as that shown in FIG. 2 is set.

Operation of the optical receiver 10 will now be described. When the APD 30 has received an optical signal while being supplied with a bias voltage from the power supply 12, a photo current corresponding to the optical signal is generated. This photo current is converted into a voltage form, whereby a pair of complementary voltage signals is generated. The discriminating block 22 receives the complementary signals via the coupling capacitors 24a, 24b.

Meanwhile, the detecting block 16 generates a monitor signal VMON corresponding to the magnitude of the optical signal, and this monitored signal VMON is converted into a signal Di. Further, the interface 52 is supplied with the dispersion signal Dd and the distance signal Dl from the host device. These signals Di, Dd, Dl, and D1 are read from the first LUT, and the signal Dl, determined from signals Di, Dd and Dl, is converted into an analog signal, thereby generating a first control signal CTRL 1.

In accordance with the first signal CTRL 1, the second signal CTRL 2 is generated. An offset voltage between the inputs of the first limiter amplifier 70 in the discriminating block 22 is adjusted in accordance with the reference voltage Vref and the second signal CTRL2. Thereby, the level of the crosspoint in the waveforms of the complementary data signals is changed. Consequently, a discrimination level for the complementary data signals is altered. The first limiter amplifier 70 in the discriminating block 22 discriminates data included in the complementary data signals at a crosspoint in the waveforms of the altered complementary data signals; namely, at an altered discrimination level.

Figure 3A:
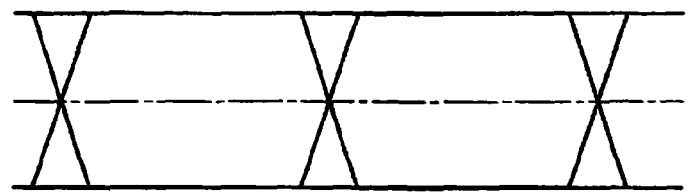
FIG. 3A is a view showing an example eye pattern of an optical signal output from an optical transmitter.
Figure 3B:
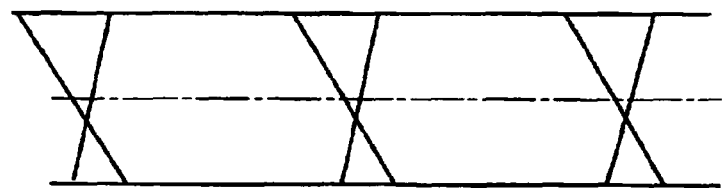
FIG. 3B is a view showing an example eye pattern obtained after the optical signal shown in FIG. 3A has traveled over an optical transmission line.

The waveform of the signal received by the optical receiver is distorted by the dispersion of the optical transmission line. The longer the communication distance, the greater the magnitude of the distortion. FIG. 3A shows an eye pattern of an optical signal output from the optical transmitter, and FIG. 3B shows an example eye pattern obtained after the optical signal shown in FIG. 3A has traveled over the optical transmission line. In the embodiment shown in FIG. 3B, the leading edge of the waveform of the optical signal becomes steep, and the falling edge of the same becomes relaxed due to the dispersion of the optical transmission line. Consequently, the crosspoint shifts toward a lower level. When the crosspoint shifts, the optical sensitivity is deteriorated.

However, the optical receiver 10 can adjust the input offset voltage of the first amplifier 70 in such a manner that the optical sensitivity is maximized, based on the dispersion signal Sd and the distance signal Sl; namely, the magnitude of the dispersion and the transmission distance of the optical transmission line. Accordingly, the crosspoint in the data signal is maintained in the neighborhood of the center between a high level and a low level, thereby avoiding the reduction of the optical sensitivity.

Further, since the amplitude of the signal varies as changing the intensity of the optical signal, the crosspoint in the waveforms of the optical signal varies when the optical signal contains the distortion. However, according to the optical receiver 10 of the present invention, the input offset voltage of the first amplifier 70 is adjusted such that the optical sensitivity is maximized, in accordance with the monitored signal VMON; namely, the intensity of the optical signal. The crosspoint of the data signal; namely, the discrimination level, is maintained in the vicinity of the center portion between the high level and the low level, thereby avoiding the decrease of the optical sensitivity.

Depending on noise superimposed on the high level and the low level of the complementary data signals, an appropriate discrimination level sometimes deviates from the neighborhood of the center level between the high level and the low level. When the influence of asymmetry of noise is small, a ratio of the offset voltage between the inputs of the first limiter amplifier 70 in the discriminating block 22 to the amplitude of an optical signal may be fixed. Specifically, when the influence of the asymmetry in the noise is small, correcting the discrimination level depending on the intensity of the optical signal, such as mentioned above, is sufficient.

Figure 4:
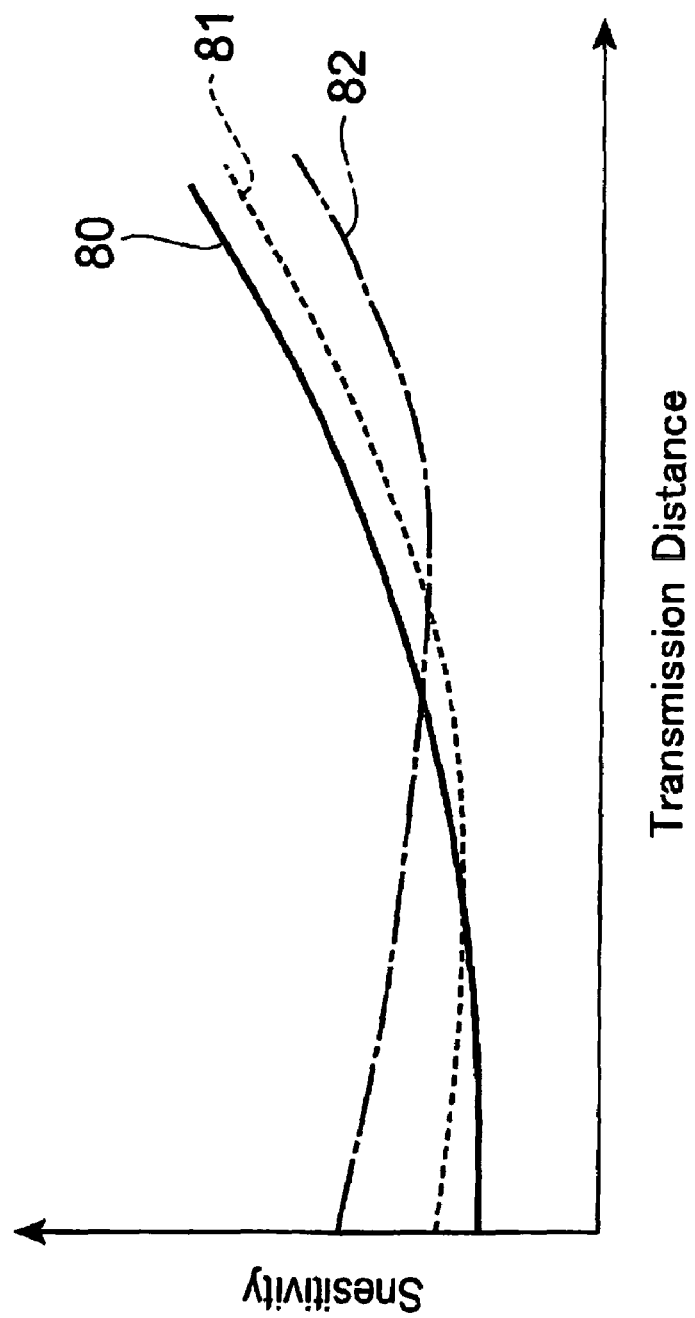
FIG. 4 is a view showing an example result of a simulation of the optical sensitivity with respect to a transmission distance.

FIG. 4 is a view showing an example result of the simulation of the optical sensitivity against a transmission distance. The amount of the dispersion also changes according to the transmission distance, and the intensity of the optical signal output from the optical transmitter is constant. When the low level of the input DATA signal of the first limiter amplifier 70 in the discriminating block 22 is taken as 0% and the high level of the same is taken as 100%, a curve 80 represents an optical sensitivity achieved when a slice level of the first limit amplifier 70 is taken as 50%. A curve 81 represents an optical sensitivity achieved when a slice level of the first limit amplifier 70 is taken as 45%. Moreover, a curve 82 represents an optical sensitivity achieved when the slice level of the first limit amplifier 70 is taken as 40%. Here, the slice level denotes a center level of the amplitude range of an input data signal selectively amplified by the first limiter amplifier 70.

Specifically, the curve 80 represents the optical sensitivity achieved when the offset voltage between the inputs of the first limit amplifier 70 is set to 0% of the amplitude of the input data signal. A curve 81 corresponds to the optical sensitivity achieved when the offset voltage between the inputs of the first limit amplifier 70 is set to 10% of the amplitude of the input data signal. Further, the curve 82 represents the receiving sensitivity characteristic achieved when the offset voltage between the inputs of the first limit amplifier 70 is set to 20% of the amplitude of the input data signal.

Thus, the slice level at which the optical sensitivity is minimized is understood to shift toward a lower level depending on the transmission distance (and the amount of the dispersion of the optical transmission line). Consequently, a reduction in the optical sensitivity at a transmission distance (and the accumulated dispersion in the optical transmission line) can be understood to be decreased by shifting the slice level to the lower level; namely, the crosspoint in the waveforms of the complementary data signals to the center of the waveforms of the data signals, based on the transmission distance (and the accumulated amount of the dispersion of the optical transmission line).

As mentioned above, the optical receiver of the present embodiment can suppress a reduction of the optical sensitivity induced by the distortion of the waveform, which is attributable to the intensity of an optical input or the dispersion of the optical transmission line, without the AGC circuit. Therefore, according to the optical receiver of the present embodiment, the optical receiver can be miniaturized and save the power consumption.

Second Embodiment

Figure 5:
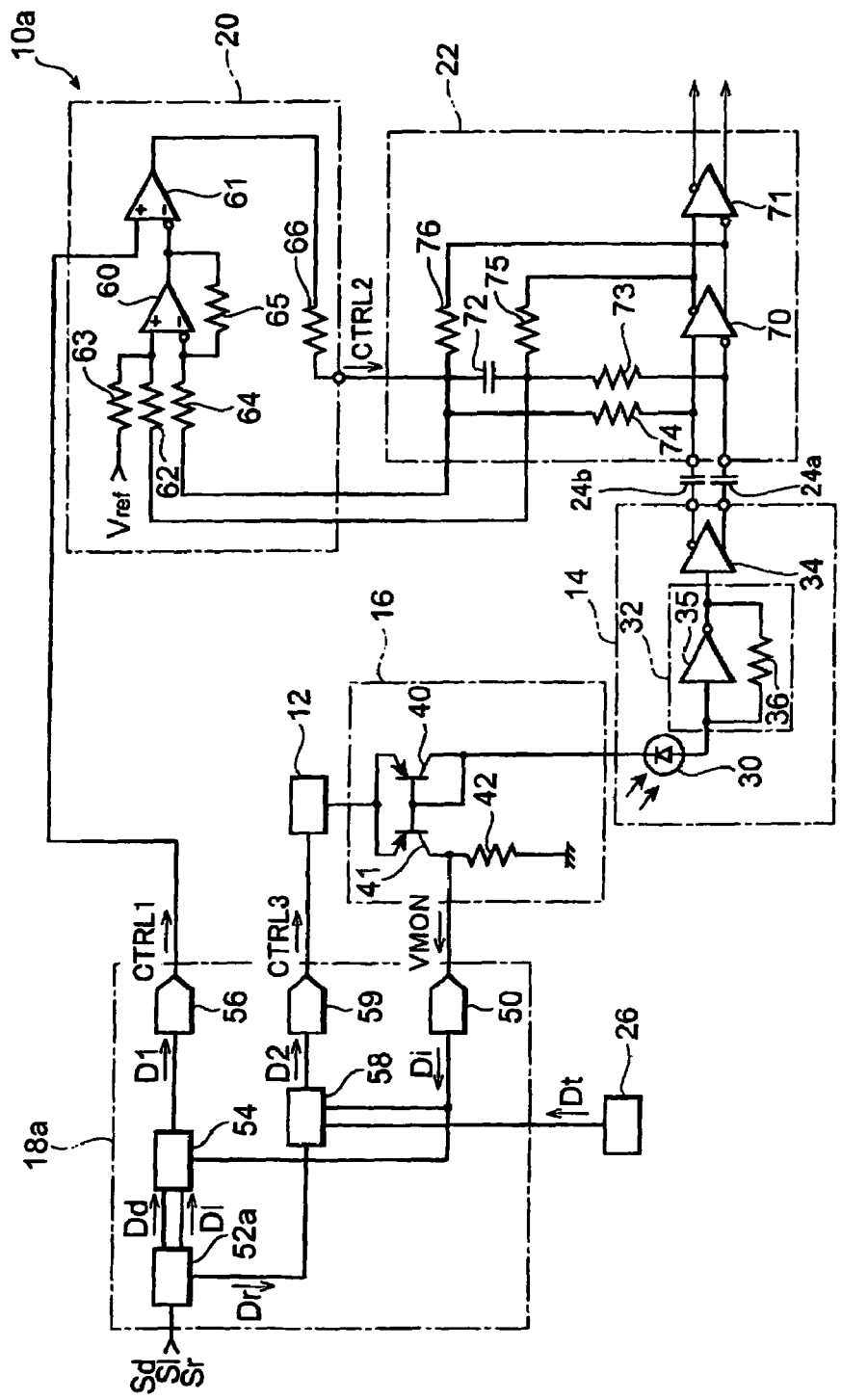
FIG. 5 is a circuit diagram showing the configuration of an optical receiver according to a second embodiment of the present invention.

FIG. 5 is a circuit diagram showing the configuration of an optical receiver according to a second embodiment of the present invention. An optical receiver 10a differs from the optical receiver 10 of the first embodiment in that a controlling block 18a is provided instead of the controlling block 18. The optical receiver 10a also differs from the optical receiver 10 in that a temperature sensor 26 is additionally provided. In other respects, the optical receiver 10a is identical in configuration with the optical receiver 10.

The temperature sensor 26 includes a temperature-sensitive element; e.g., a thermistor, and monitors the surface temperature of the APD 30 or an ambient temperature thereof. The temperature sensor 26 generates a temperature digital signal Dt corresponding to the surface temperature of the APD 30 or the ambient temperature thereof. The temperature sensor 26 outputs this temperature digital signal Dt to the controlling block 18a.

The controlling block 18a differs from the controlling block 18 in that an interface 52a is provided in stead of the interface 52. The controlling block 18a also differs from the controlling block 18 in that a second memory 58 and a second digital-to-analog converter (hereinafter abbreviated as "D/A-C") 59 are additionally provided. In other respects, the controlling block 18a is identical in configuration with the controlling block 18.

Upon receipt of the dispersion signal Sd, the distance signal Sl, and the transmission rate signal Sr from the host device, the interface 52a generates a dispersion digital signal Dd corresponding to the dispersion signal Sd, a distance digital signal Dl corresponding to the distance signal Sl, and a transmission rate digital signal Dr corresponding to the transmission rate signal Sr. The transmission rate signal Sr changes based on the data bit rate of the optical signal. An output terminal of the interface 52 is connected to the first memory 54 and the second memory 58. The interface 52 outputs the dispersion digital signal Dd and the distance digital signal Dl to the first memory 54, as well as outputting the transmission rate digital signal Dr to the second memory 58.

The second memory 58 is connected to the A/D-C 50 and the temperature sensor 26, as well, and receives inputs of the intensity digital signal Di and the temperature digital signal Dt. The second memory 58 outputs a second digital signal D2 corresponding to the transmission rate digital signal Dr, the intensity digital signal Di, and the temperature digital signal Dt. Accordingly, the second memory 58 stores in a second lookup table (hereinafter abbreviated as "LUT") a plurality of values used for altering the bias voltage of the APD 30. These values are assigned to a plurality of sets, each of which comprises a transmission rate, intensity of an optical signal, and a temperature. Namely, these values correspond to the value of the second digital signal D2, and are stored in the second memory 58 in association with the transmission rate digital signal Dr, the intensity digital signal Di, and the temperature digital signal Dt.

Figure 6:
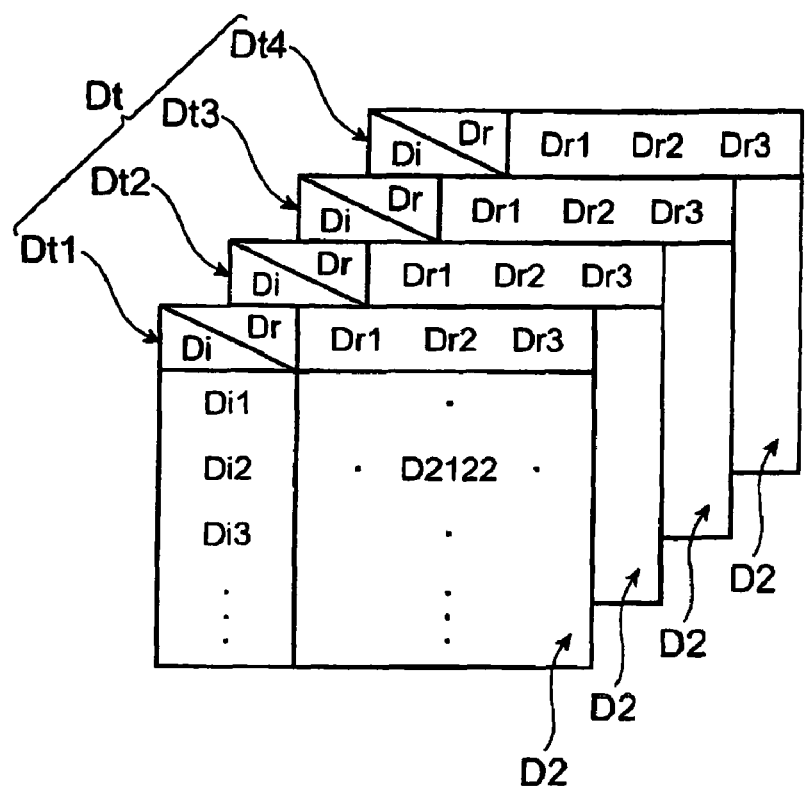
FIG. 6 is a view showing an example of a second LUT.

FIG. 6 is a view showing an example of the second LUT. For instance, assuming that the temperature digital signal Dt is Dt1, the transmission rate digital signal Dr is Dr2, and the intensity digital signal Di is Di2, the second digital signal D2 is determined as D2122.

The second digital signal D2 maintains the optical sensitivity at an essentially-constant level even when the transmission rate has decreased. Further, the second digital signal D2 is for setting a multiplication factor of the APD 30 at the minimum receiving level, at which the intensity of signal light is small, in such a way that the optical sensitivity is minimized. In accordance with the increase of the optical intensity of the signal light, the second digital signal D2 decreases the multiplication factor of the APD 30. The second digital signal D2 is for setting the multiplication factor of the APD 30 at the minimum receiving level, at which the intensity of the signal light is small, in such a way that the optical sensitivity is minimized even when a change has occurred in the temperature of the APD 30.

The multiplication factor M of the APD is defined as follows:

$$M = 1/\{1-(V_{APD}/V_B)^n\}$$

$$V_B = V_{B0} \times (1+\Delta T \times \beta)$$

$V_{APD}$: a bias voltage
$V_B$: a breakdown voltage
$V_{B0}$: a constant depending on a diode
n: a constant depending on a diode
$\beta$: a temperature coefficient (0.1%/° C. to 0.3%/° C. or thereabouts)

Thus, the multiplication factor M depends on the temperature $\Delta T$ of the APD. Consequently, in order to achieve, at the minimum receiving level where the optical intensity of the signal light is small, the multiplication factor M of the APD 30 such that the optical sensitive is minimized, the bias voltage $V_{APD}$ must be altered in accordance with a change in the temperature $\Delta T$.

Such a second LUT may also be set on the basis of, e.g., a test result performed in advance or a measurement of an individual optical receiver at the shipment. The second LUT may also be set on the basis of, e.g., a simulation result.

The second memory 58 is connected to an input terminal of the second D/A-C 59, and the second digital signal D2 is input to the input terminal of the second D/A-C 59. The second D/A-C 59 generates a third signal S3 corresponding to the second digital signal D2. An output terminal of the second D/A-C 59 is connected to a control terminal 12i of the power supply 12.

The power supply 12 alters the magnitude of an output voltage thereof in accordance with the level of the third signal S3. Specifically, the bias voltage of the APD 30 is altered based on the transmission rate, the optical intensity of the signal light, and the temperature of the APD 30.

Figure 7:
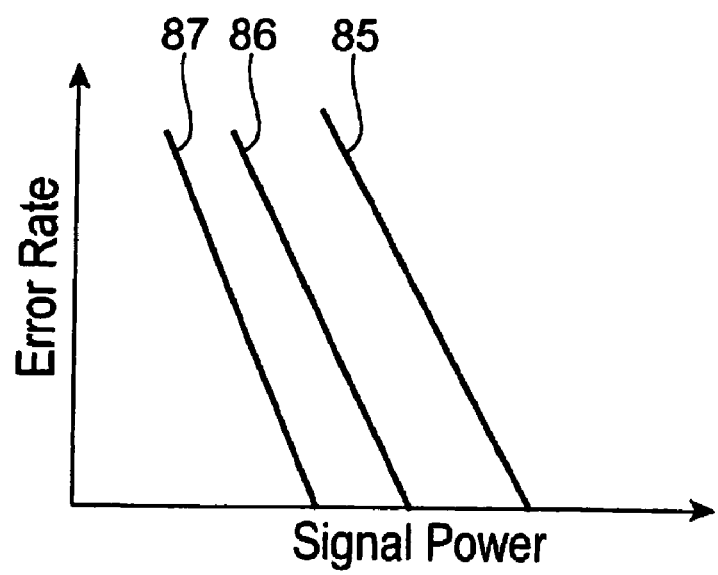
FIG. 7 is a view showing an example result of a simulation of an error rate with respect to the optical intensity of a signal.

FIG. 7 is a view showing an example of the simulation for an error rate against the optical intensity of the signal light. A curve 85 represents an error rate of an optical receiver obtained when the transmission rate of the optical signal is 2.48 GHz. A curve 86 represents an error rate of an optical receiver obtained when the transmission rate of the optical signal is 622 MHz. A curve 87 represents an error rate characteristic of an optical receiver obtained when the transmission rate of the optical signal is 155 MHz. As mentioned above, when the transmission rate of the optical signal has decreased, the phase margin of the optical signal and the phase margin of the data signal received by the discriminating block 22 become greater. Accordingly, the optical sensitivity is increased, and the optical receiver realizes the optical sensitivity greater than that required.

In accordance with the transmission rate signal Sr, the optical receiver of the present embodiment alters the bias voltage of the APD 30; namely, the multiplication factor. Accordingly, the bias voltage of the APD 30 can be decreased in such a way that the optical sensitivity is maintained essentially constant against the transmission rate of the optical signal, when the transmission rate of the optical signal has decreased. Consequently, in addition to the advantage appeared in the optical receiver of the first embodiment, the optical receiver of the present embodiment can save the power consumption when the transmission rate of the optical signal is low.

Figure 8:
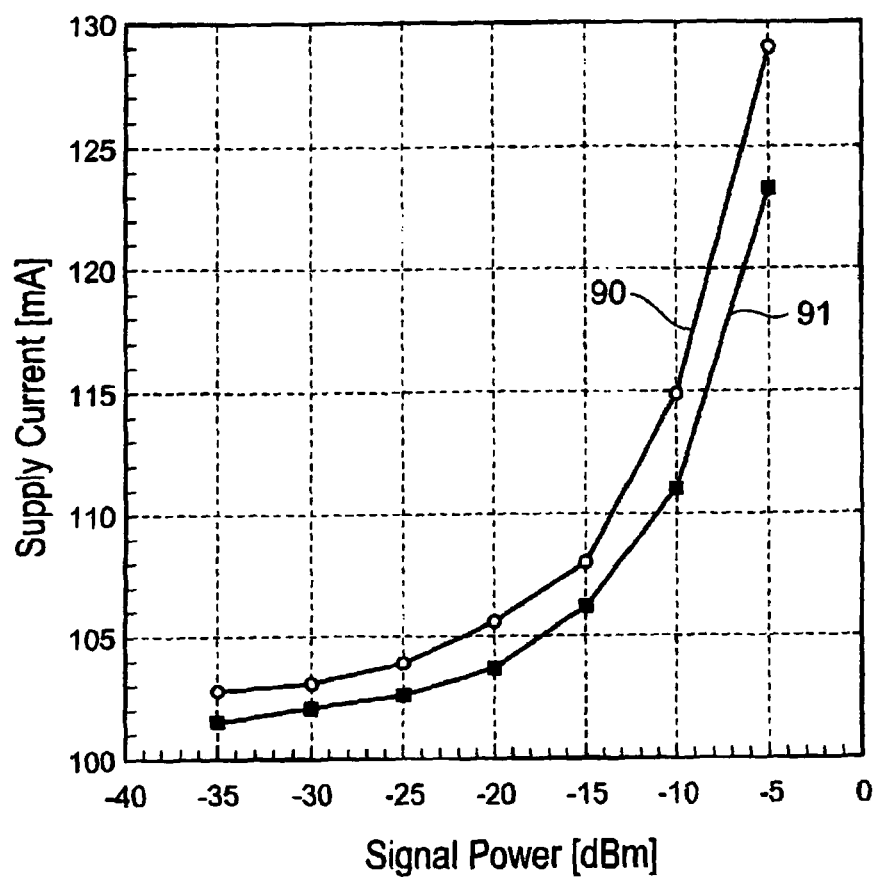
FIG. 8 is a view showing an example of a simulation of current consumption with respect to the optical intensity of a signal.

FIG. 8 is a view showing an example of a simulation of the current consumption against the optical intensity of the signal light. Results shown in FIG. 8 are obtained at high temperatures where current consumption is large. A curve 90 represents a current consumption of an optical receiver obtained when an optical signal with a transmission rate of 2.5 Gbps is received. A curve 91 represents a current consumption of an optical receiver obtained when an optical signal with a transmission rate of 155 Mbps is received. Namely, this characteristic is obtained when the bias voltage of the APD 30 is decreased such that the optical sensitivity becomes analogous to the optical sensitivity for the optical signal with a transmission rate of 2.5 Gbps. According to FIG. 8, the current consumption is understood to be saved by about 6 mA at the maximum optical intensity of −5 dBm where the current consumption is large.

In accordance with the intensity signal VMON, the optical receiver of the present embodiment alters the bias voltage of the APD 30; namely, the multiplication factor. Accordingly, the bias voltage of the avalanche photodiode can be decreased when the intensity of signal light has increased. Consequently, the optical receiver of the present embodiment can save the power consumption when the intensity of signal light is large.

Moreover, in accordance with the temperature digital signal Dt, the optical receiver of the present embodiment alters the bias voltage of the APD 30; namely, the multiplication factor. Accordingly, even when fluctuations have occurred in the temperature of the APD 30, the multiplication factor of the APD 30 is compensated such that the optical sensitivity is minimized. Particularly, the optical receiver of the present embodiment has an advantage in that, even when fluctuations have occurred in the temperature of the APD 30 at small intensity of the signal light, the multiplication factor of the APD 30 is corrected such that the optical sensitivity is minimized.

Although the embodiments of the present invention are described thus far, the present invention is susceptible to various modifications without being limited to the embodiments.

What is claimed is:

1. An optical receiver for outputting an output signal corresponding to an optical signal received thereby, comprising:
   a light-receiving block including an avalanche photodiode for receiving the optical signal, the light-receiving block being configured to output a pair of electrical signals complementary to each other, the complementary electrical signals corresponding to the optical signal;
   a detection block configured to detect a magnitude of the optical signal;
   a discriminating block configured to discriminate the complementary electrical signals based on a discrimination level, the discriminating block including a differential amplifier configured to receive the complementary electrical signals output from the light-receiving block to output the output signal;
   an adjusting block; and
   a controlling block configured to store, in advance of operation of the optical receiver, a plurality of first control signals and a plurality of second control signals and to select one of the first control signals based on a plurality of control parameters including a magnitude of the optical signal and a temperature of the avalanche photodiode as an output to cause the adjusting block to adjust the discrimination level by adjusting an input offset voltage of the differential amplifier, and to select one of the second control signals based on the temperature of the avalanche photodiode as an output to bias the avalanche photodiode.

2. The optical receiver according to claim 1,
   wherein the control parameters include a transmission rate of the optical signal, and
   wherein the controlling block is configured to select one of the second control signals based on the temperature of the avalanche photodiode and the transmission rate and to output the selected second control signal as the bias for the avalanche photodiode.

3. The optical receiver according to claim 1,
   wherein the control parameters include dispersion of a transmission line where the optical signal is transmitted.

4. The optical receiver according to claim 1,
   wherein the control parameters include a distance of a transmission line where the optical signal is transmitted.

5. The optical receiver according to claim 1, wherein the control parameters include a transmission rate of the optical signal.

6. The optical receiver according to claim 1,
   wherein the controlling block includes a first memory to hold the first control signals as a look-up table in accordance with the plurality of control parameters.

7. An optical receiver for outputting an output signal corresponding to an optical signal received thereby, comprising:
   a light-receiving block including an avalanche photodiode for receiving the optical signal, the light-receiving block being configured to output a pair of electrical signals complementary to each other, the complementary electrical signals corresponding to the optical signal;
   a detection block configured to detect a magnitude of the optical signal;
   a discriminating block configured to discriminate the complementary electrical signals based on a discrimination level, the discriminating block including a differential amplifier configured to receive the complementary electrical signals output from the light-receiving block to output the output signal;
   an adjusting block; and
   a controlling block configured to store, in advance of operation of the optical receiver, a plurality of first control signals and a plurality of second control signals and to select one of the first control signals based on a plurality of control parameters including a magnitude of the optical signal and a temperature of the avalanche photodiode as an output to cause the adjusting block to adjust the discrimination level by adjusting an input offset voltage of the differential amplifier, and to select one of the second control signals based on a transmission rate of the optical signal as an output to bias the avalanche photodiode.

8. An optical receiver for outputting an output signal corresponding to an optical signal received thereby, comprising:

a light-receiving block including an avalanche photodiode for receiving the optical signal, the light-receiving block being configured to output a pair of electrical signals complementary to each other, the complementary electrical signals corresponding to the optical signal;

a detection block configured to detect a magnitude of the optical signal;

a discriminating block configured to discriminate the complementary electrical signals based on a discrimination level, the discriminating block including a differential amplifier configured to receive the complementary electrical signals output from the light-receiving block to output the output signal;

an adjusting block; and a controlling block configured to store, in advance of operation of the optical receiver, a plurality of first control signals and a plurality of second control signals and to select one of the first control signals based on a plurality of control parameters including a magnitude of the optical signal and a temperature of the avalanche photodiode as an output to cause the adjusting block to adjust the discrimination level by adjusting an input offset voltage of the differential amplifier, and to select one of the second control signals based on the temperature of the avalanche photodiode and a transmission rate of the optical signal as an output to bias the avalanche photodiode.

* * * * *